United States Patent [19]

Koto et al.

[11] 4,364,067

[45] Dec. 14, 1982

[54] HIGHLY INTEGRATED INK JET HEAD

[75] Inventors: Haruhiko Koto; Junichi Okada, both of Shiojiri, Japan

[73] Assignees: Kabushiki Kaisha Suwa Seikosha, Tokyo; Shinshu Seiki Kabushiki Kaisha, Nagano, both of Japan

[21] Appl. No.: 201,104

[22] Filed: Oct. 28, 1980

[30] Foreign Application Priority Data

Oct. 29, 1979 [JP] Japan ................................ 54-139531
Oct. 29, 1979 [JP] Japan ................................ 54-139532

[51] Int. Cl.³ ................................ G01D 15/16
[52] U.S. Cl. ................................ 346/140 R
[58] Field of Search ......................... 346/140 R, 139 C

[56] References Cited

U.S. PATENT DOCUMENTS

| | | | |
|---|---|---|---|
| 3,747,120 | 7/1973 | Stemme | 346/140 X |
| 3,848,258 | 11/1974 | Mahoney | 346/140 |
| 3,904,010 | 9/1975 | Krauss | 346/139 C X |
| 3,946,398 | 3/1976 | Kyser | 346/140 X |
| 3,988,745 | 10/1976 | Sultan | 346/140 |
| 4,015,271 | 3/1977 | Sultan | 346/140 |
| 4,074,284 | 2/1978 | Dexter | 346/140 |
| 4,104,645 | 8/1978 | Fischbeck | 346/140 |
| 4,158,847 | 6/1979 | Heinzl | 346/140 |
| 4,216,477 | 8/1980 | Matsuda | 346/140 |

OTHER PUBLICATIONS

Pelkie et al; Ink Jet Head; IBM TDB vol. 20, No. 2, Jul. 1977, pp. 553-554.

*Primary Examiner*—Joseph W. Hartary
*Attorney, Agent, or Firm*—Blum, Kaplan, Friedman, Silberman and Beran

[57] ABSTRACT

A head for an ink-on-demand jet dot printer is highly integrated to provide a large plurality of closely spaced dots by combining more than one head of lesser dot density as components of a single unit. The dots from the separate component heads are interspaced on the print recording medium to provide characters of high quality. Commonality of elements provides for a miniaturized head. In another embodiment independent pressure chambers, channels and nozzles are formed on opposite sides of a common baseplate.

10 Claims, 22 Drawing Figures

FIG. 5
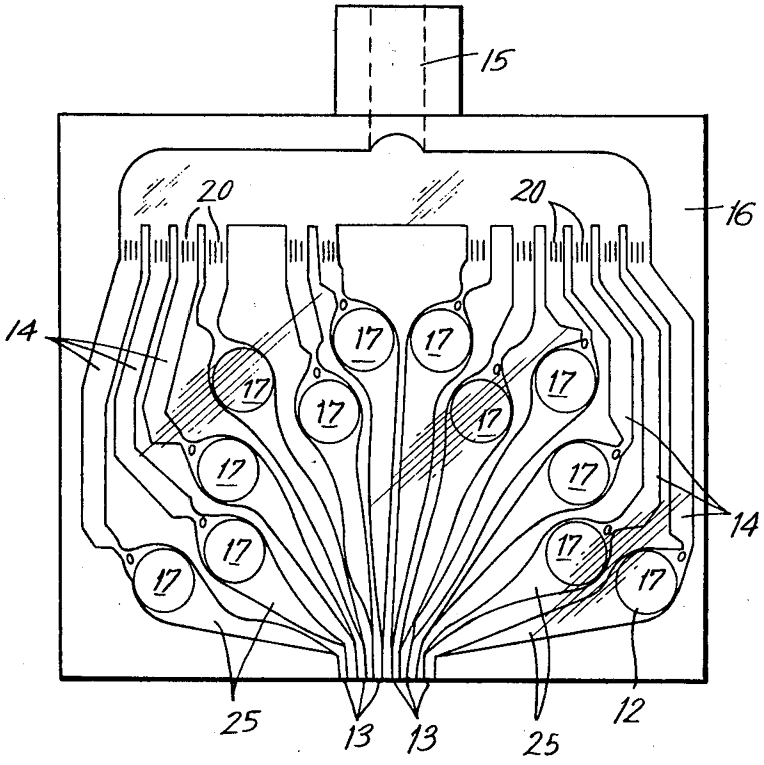
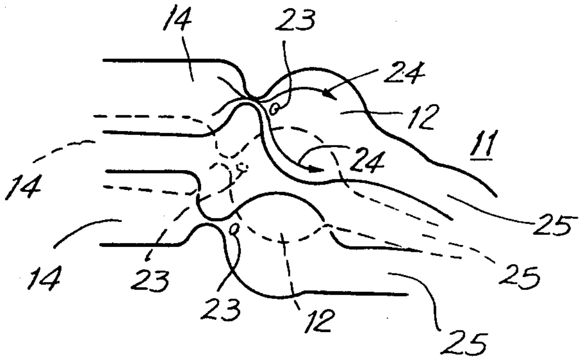
FIG. 6

FIG. 11
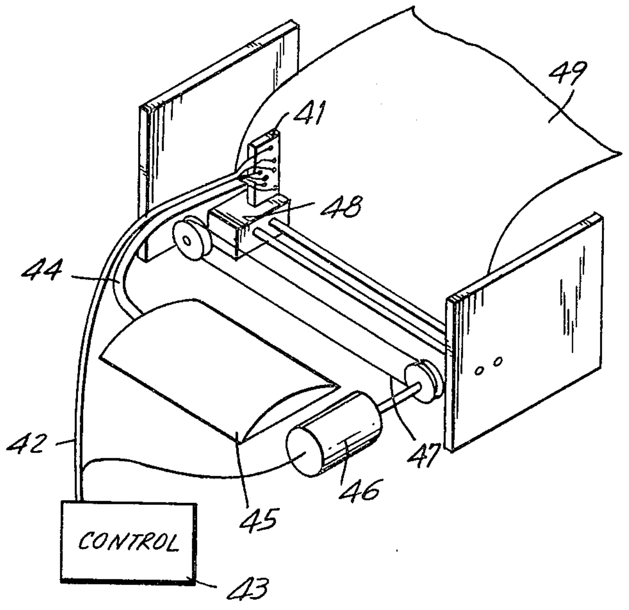
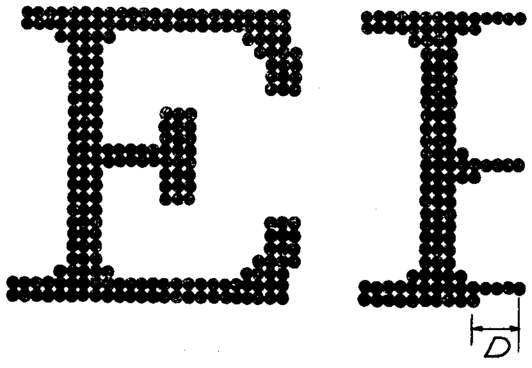
FIG. 12

FIG. 14
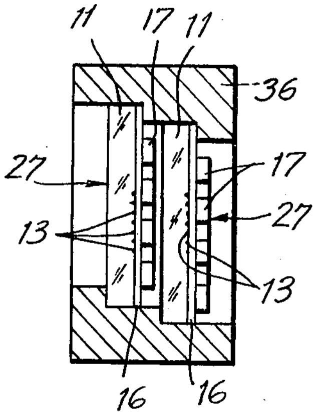
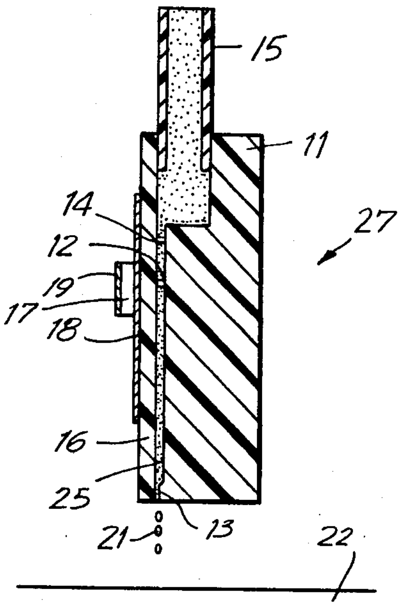
FIG. 13
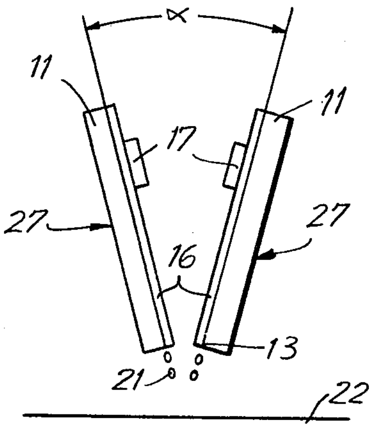
FIG. 15

HIGHLY INTEGRATED INK JET HEAD

BACKGROUND OF THE INVENTION

This invention relates generally to an ink-on-demand ink jet printing head of the type used to produce characters on a print recording medium and more particularly to an ink jet head which is highly integrated to provide a large plurality of closely spaced dots. Ink jet printing has attracted wide attention because normal paper can be used for printing thereon. Printing speed is sufficiently high with an ink jet printer and the energy consumption for printing is small. Particularly, construction of an entire printing device is simplified and energy consumption for printing is small in an ink-on-demand type ink jet printer wherein the ink is ejected only as it is required to form a marking, e.g., a dot on the print recording medium.

However, printing speed is usually low and only a few jets are provided in a print head. Therefore, highly integrated heads made by combining a plurality of nozzles have been proposed and some of these devices have been put into practical application. However, the conventional ink jet head can include approximately seven to seventeen nozzles at best. Thus, print quality suffers and there has been no printer of this type having printing characteristics which are comparable to the quality produced by using a solid font. Also, the integrated ink jet heads of the prior art tend to be large in size and complicated in construction.

What is needed is an ink jet printing head which provides a large plurality of ink jets and is highly integrated such that size is small and complexity is low.

SUMMARY OF THE INVENTION

Generally speaking, in accordance with the invention, a highly integrated ink jet head especially suitable for providing high quality printed characters on a print recording medium is provided. The ink jet head provides a large plurality of closely spaced dots by combining more than one head of lesser dot density as components of a single print head unit. The dots from the separate component heads are interspaced on the print recording media to provide characters of high quality and commonality of elements provides for a miniaturized head. Ink flow channels of approximately equal length are provided and the pressure chamber contours assure that air bubbles are expelled. In another embodiment independent pressure chambers, channels and nozzles are formed on opposite sides of a common baseplate.

Accordingly, it is an object of this invention to provide an improved ink jet head which is highly integrated to provide a large plurality of nozzles in a small package.

Another object of this invention is to provide an improved ink jet head which is highly integrated by combining less integrated component heads.

A further object of this invention is to provide an improved ink jet head having a plurality of nozzle rows, each row printing dots interposed with the dots of the other row.

Still another object of this invention is to provide an improved ink jet head having a plurality of nozzle rows and means for adjusting the distance to the recording medium.

Yet another object of this invention is to provide an improved highly integrated jet head which is miniaturized, simple in construction and economical to produce.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a side elevational view of the ink jet head of FIG. 4;

FIG. 6 is a portion of the ink jet head of FIG. 5 to an enlarged scale showing the pressure chambers;

FIG. 11 is a top perspective view of a printer including an ink jet head in accordance with FIG. 8;

FIG. 12 shows a printed character provided by the printer of FIG. 11;

FIG. 13 is a sectional view in elevation of another embodiment of an ink jet head;

FIG. 14 is a front view of an ink jet head in accordance with this invention;

FIG. 15 is a side elevational view of the ink jet head of FIG. 14;

DESCRIPTION OF THE PREFERRED EMBODIMENTS

Figure 1:
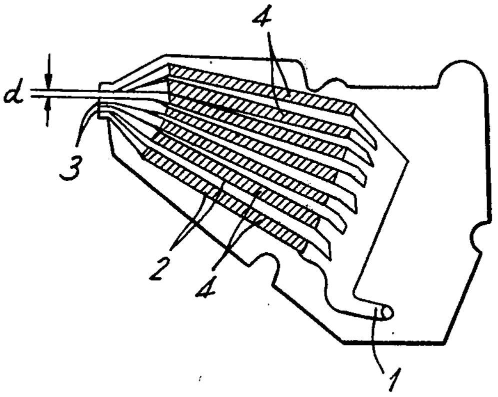
FIG. 1 PRIOR ART
FIG. 1 is a side elevational view of an ink jet head of the prior art.

FIG. 1 shows an example of a prior art ink jet head. Ink flows from an ink tank (not shown) and enters the head through a supply channel 1 and fills the pressures chambers 2. The pressure chambers 2 connect to nozzles 3, and a piezoelectric element 4 is disposed on the upper surface of each pressure chamber 2 with a vibration plate separating the pressure chamber and the piezoelectric element 4. In the known manner voltage is applied to the piezoelectric element by means of conductive materials (not shown) which causes the piezoelectric element 4 to deflect. Deflection of the piezoelectric element 4 deflects the vibration plate and rapidly reduces the volume of the pressure chamber 2. Thereby the content of the pressure chamber 2, that is, ink, is ejected as a jet from the nozzle 3 and printing is accomplished when the ink drop is received on a print recording media such as paper (not shown). In a prior art ink jet head, as shown in FIG. 1, seven nozzles 3 are disposed in a line and the distance d between nozzles 3 is approximately 0.35 mm (millimeters).

In order to obtain a character of high quality similar to that obtained by a conventional solid font, it is necessary to have a high density of dots produced by integrating 16 to 36 nozzles. In an ink jet head as constructed in FIG. 1, there is difficulty in making the distance d between nozzles in the range of 0.1 to 0.16 mm. Even if it were possible to make the distance d between the nozzles in the range of 0.1 to 0.16 mm, the distance between the pressure chamber 2 and the nozzle 3 is relatively long and performance of the jets is deteriorated when 16 to 36 nozzles are provided in one head. Further, the pressure chambers require an area space 3 to 5 times as large as the space required for the pressure chambers in the embodiment shown in FIG. 1. Accordingly, the head is large and very difficult to be used in a practical application.

Figure 2:
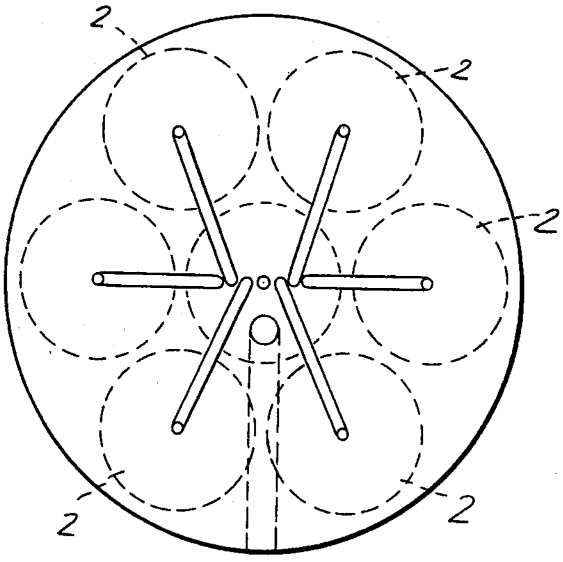
FIG. 2 PRIOR ART
FIG. 2 and FIG. 3 are back and side sectional views of another ink jet head of the prior art.
Figure 3:
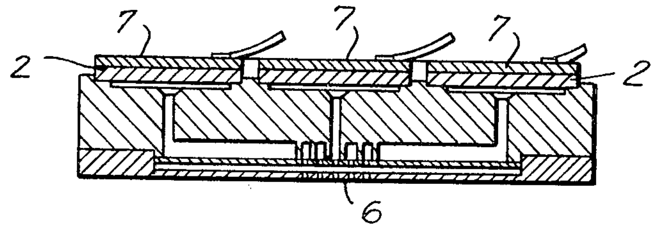
FIG. 3 PRIOR ART

Another print head of the prior art is shown in FIGS. 2 and 3. In this embodiment, a nozzle 6 ejects ink perpendicularly to a piezoelectric element 7. A plurality of pressure chambers 2 are arranged in a circular pattern and connect to individual nozzles 6. In such an embodiment, it is very difficult to make a highly integrated head having more than twenty-four nozzles 6. As stated above, the distance between nozzles can be made small only with great difficulty and the space required for pressure chambers is large. Accordingly, this head cannot be anything but large when it includes a large number of nozzles.

This highly integrated ink jet head in accordance with this invention overcomes the deficiencies of the prior art print heads and provides a small and low cost printing head of the ink-on-demand type. Characters of high quality are produced.

Figure 4:
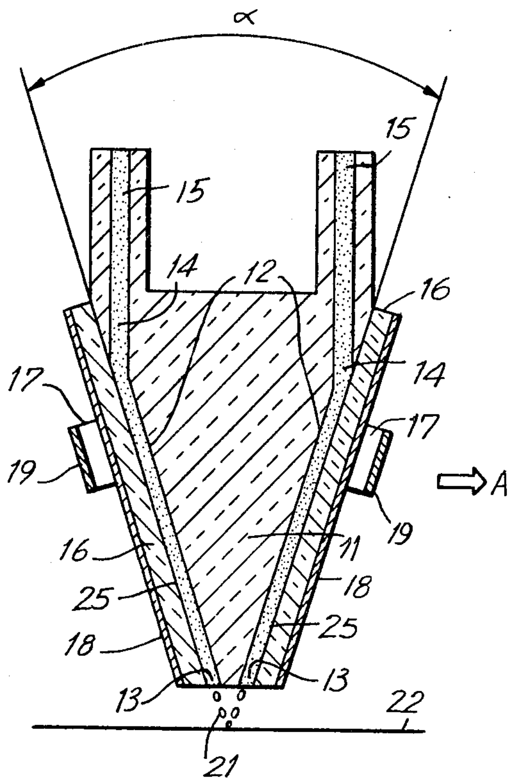
FIG. 4 is a sectional view in elevation of an ink jet head in accordance with this invention.

FIG. 4 is a sectional view and FIG. 5 is a side view of an ink jet head in accordance with this invention. The ink jet head includes a baseplate 11 having formed in the two side faces pressure chambers 12, nozzles 13, supply channels 14 and discharge passages 25. Each pressure chamber 12 is connected to an ink supply pipe 15. Vibration plates 16 are attached to both sides of the baseplate 11 and piezoelectric elements 17 are attached to each vibration plate 16. The piezoelectric elements 17 are in registry with the pressure chambers 12. An electrode 18 is formed on the vibration plate 16 and an electrode 19 is formed on the piezoelectric element 17. The piezoelectric elements 17 are circular having a diameter of 2.5 mm. As seen in FIG. 5 distances from the nozzles 13 to each piezoelectric element 17 are varied, being longer and shorter in a staggered arrangement which permits the piezoelectric element 17 to nestle between channels leading to independent nozzles 13. This construction allows for a very compact head such as 22 millimeters by 22 millimeters in the side view as seen in FIG. 5. Also, the average distance between the pressure chambers 12 and the nozzles 13 is reduced.

Thus, an ink jet head can be highly integrated without deterioration of the ink jet performance. Resistances to flow in the connecting ducts between the pressure chambers 12 and each nozzle 13 are virtually equal. An ink flow channel from the supply pipe 15 to the nozzle 13 is everywhere smoothly joined and the ink does not stagnate in the passages.

As shown in FIG. 6, a flow dividing member 23 is positioned at the entrance to the pressure chamber 12 where ink flows in from the supply channel 14. Ink flows around the dividing member 23 in the directions indicated by the arrows 24. Thus, the dividing member 23 prevents ink from flowing only through the center portion of the pressure chamber 12. As stated above, the ink stagnates nowhere in the system such that any air bubble which inadvertently is mingled in the ink is easily discharged from the nozzle 13 simultaneously with the ink. Thus, clogging of the head is prevented and reliability of the head is increased.

Figure 7:
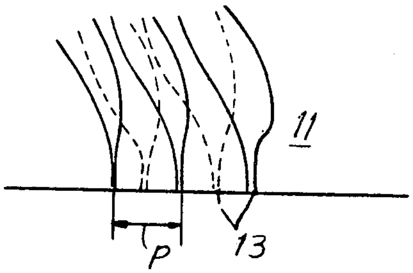
FIG. 7 is a view similar to FIG. 6 showing the nozzles of FIG. 5.

Fine grooves 20, as seen in FIG. 5 as lines, are formed in the supply channel 14. The transverse dimensions of the grooves 20 are smaller than those of the nozzles and these grooves serve to filter particulate matter, if any, from the ink. Both sides of the baseplate 11 are formed with pressure chambers 12, nozzles 13, etc., substantially as shown in FIG. 5. As seen in FIG. 7, the nozzles 13 are arranged in rows on opposite sides of the baseplate 11 with the nozzles 13 on one side of the baseplate 11 being offset by a half pitch distance p between nozzles. Thus, as seen in FIG. 7 in the linear direction of a row of nozzles 13, the nozzles 13 in combination are spaced half a pitch distance p apart. Thus, an effective nozzle spacing is achieved using both sides of the baseplate 11 which could not be practically achieved for physical reasons using only one side of the baseplate 11. Even when the pitch p on one side of the baseplate 11 is 0.3 mm, the pitch of the nozzles in the aggregate including both sides of the baseplate is 0.15 mm such that a print head is highly integrated, that is, has a large plurality of closely spaced nozzles.

Operation of the ink jet printer head of FIGS. 4–7 is now described. Ink flows out from an ink tank (not shown) and passes through tubing (not shown) which connects to each supply pipe 15. The ink flows from the supply pipe 15 into the cavity between the vibration plate 16 and the baseplate 11, fills the supply channels 14, and discharge passages 25 leading to the nozzles 13. With the internal cavities filled with ink, a voltage is applied between the electrode 19 on the surface of the piezoelectric element 17 and the electrode 18 on the outer surface of the vibration plate 16. The conductive connections to the electrodes 18, 19 by which the voltage is applied, are not shown in the FIGS. Application of the electrical voltage to the electrodes 18, 19 causes a displacement in the piezoelectric element 17. This then causes the vibration plate 16 to bend such that the volume of the pressure chamber 12 adjacent to an energized piezoelectric element 17 is decreased. As a result, ink drops 21 are ejected from the nozzles 13 associated with energized piezoelectric elements 17 and these ink drops are received on a recording paper 22 so as to produce printed characters or symbols.

As seen in FIG. 4, the vibration plate 16 on both sides of the baseplate 11 are not parallel but are separated by an angle $\alpha$. Accordingly, the ink drops 21 are ejected toward the recording paper at the angle $\alpha$. When the ink drops 21 from the opposite sides of the print head intersect just at the receiving surface of the recording paper 22, the dots on the paper formed by these ink drops lie in a single line. The head moves relative to the print recording paper 22 in the direction indicated by the arrow A, and because both lines of nozzles 13 are printing the same line, the piezoelectric elements 17 on both sides of the baseplate 11 have the activating voltage applied at the same time. Thus, the control circuit is made simple.

It is preferred that the angle is as narrow as possible because when the angle α is large, the ink drops 21 attach obliquely to the recording paper 22 and the dot which is produced is not truly round as is most desirable. Further, when the angle α is large, ink drops 21 emanating from nozzles 13 on both sides of the baseplate 11 do not attach in a straight line if there is any variation of the distance between recording pper 22 and the nozzles 13 from the ideal distance which provides for an intersection of the jet lines exactly at the surface of the paper 22. When a perfect intersection, as indicated in FIG. 4, is absent, then printing quality is diminished. For this reason, as stated above, the angle α is preferred to be as small or narrow as possible.

Figure 8:
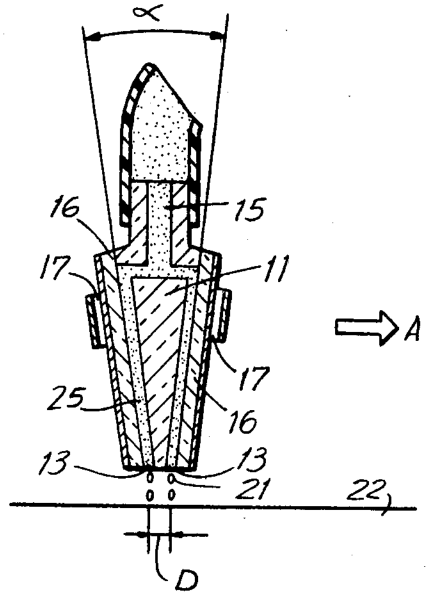
FIG. 8 is a sectional view in elevation of an alternative embodiment of an ink jet head in accordance with this invention.

However, the narrow or tip end of the baseplate 11 where the nozzles 13 are located, cannot be brought to a very sharp point as this can weaken the end of the baseplate 11. In the embodiment of FIG. 8, this difficulty is overcome by having the ink drops 21 from the opposite sides of the baseplate 11 attach to the recording paper 22 at a distance D from each other. That is, if both sides of the head were simultaneously energized two lines of dots woulld be produced. This is a primary difference between the embodiments of FIGS. 4 and 8. In order to have the nozzles 13 on both sides of the ink jet head print dots along the same line on the recording paper 22, the application of energizing voltages to the piezoelectric elements 17 of the left side is delayed from the application of voltage to the piezoelectric elements 17 of the right side when the ink jet head is moved in the direction indicated by the arrow A. This requires a more complicated control circuit or character generator than is needed in the embodiment of FIG. 4. However, the physical difficulties are overcome and the angle α is easily made small as compared to the difficulties in construction of the embodiment of FIG. 4. When the distance D is a non-integral multiple of the pitch distance between dots in the dot matrix which composes the character on the recording paper 22, the time for applying a voltage to the piezoelectric elements 17 on the right side of the baseplate 11 is distinctly different from the time of energizing the piezoelectric elements 17 on the left side of the baseplate 11. In this manner, a peak current drain for driving the piezoelectric elements 17 in the ink jet head is reduced to the advantage in sizing of the power supply. It is possible to implement a dynamic drive. When the number of nozzles is twenty-four, the number of signal lines which is normally required to be twenty-five, can now be reduced to fourteen. The complexity of the driving circuits can also be decreased.

When the angle α is 0, that is, the baseplate 11 is a flat plate having parallel opposite sides, there is no difficulty as is caused when the angle α is large. In the embodiment of FIG. 8, because the angle α is small, the right and left sides of the print head are supplied with a single supply pipe 15 as compared to the two supply pipes 15 as shown in FIG. 4. When the angle α is small and the baseplate 11 is thin, the pressure chambers 12 on the right side of the baseplate 11 are disposed alternately or in a staggered condition relevant to the pressure chambers 12 on the left side as indicated in FIG. 6 by the broken lines. In this way the pressure pulses induced in the pressure chamber 12 on one side of the baseplate 11 does not interfere with the pressure chambers on the other side of the baseplate 11.

Figure 9:
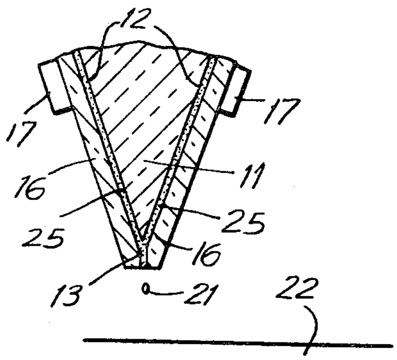
FIG. 9 is a fragmentary sectional view in elevation of another alternative embodiment of an ink jet head in accordance with this invention.

In FIG. 9 another embodiment of an ink jet head in accordance with this invention is shown. The baseplate 11 converges virtually to a point and the vibration plates 16 on opposite sides of the baseplate 11 connect with each other beyond the tip end of the baseplate 11 to form the nozzles 13. In this embodiment, ink drops 21 are ejected from the print head nozzles 13 at right angles to the recording paper 22 and a nicely rounded printed dot is produced. Further, because of the perpendicular approach of the ink drops 21 to the paper 22, deterioration in the quality of the printed character does not occur as a result of variations in the distance between the recording paper 22 and the nozzles 13. In operation, there is less mechanical backlash and rattling in using the print head of FIG. 9 as compared to the print head of FIG. 8. Ink drops ejected from both sides of the baseplate 11 arrive at the same time and in the same line on the paper 22.

Figure 10:
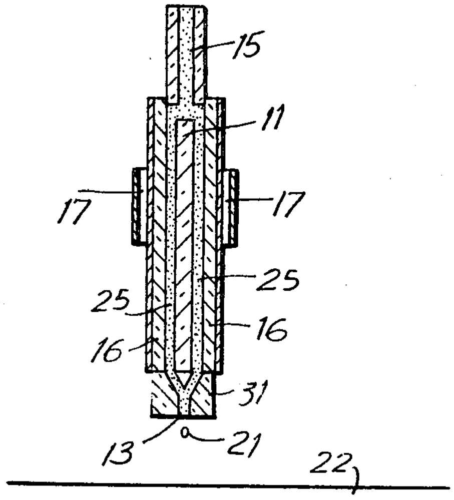
FIG. 10 is a view similar to FIG. 8 showing yet another alternative embodiment of this invention.

FIG. 10 shows another alternative embodiment of an ink jet head in accordance with this invention. The baseplate 11 has parallel opposite side surfaces and a flat transverse bottom surface. The vibration plates 16 have their lower ends (FIG. 10) colinear with the lower surface of the baseplate 11 and a nozzle member 31 in which the nozzles 13 are formed abuts the lower surfaces of the baseplate 11 and vibration plates 16. The discharge passages 25 connect to the nozzles 13 in the nozzle member 31 to provide the continuous flow paths to the row of nozzles 13. Ink drops 21 are ejected from the nozzles 13 at right angles to the recording paper 22 and the dots of a single line are printed simultaneously. The ink flow channel for the nozzle 13 in the nozzle member 31 is short. The nozzle member 31 is easily manufactured by embedding copper wires in synthetic resins and then applying an etching solution of ferric chloride which removes the copper leaving the open passages.

The arrangement of pressure chambers 12 and nozzles 13 as seen in the side views are substantially the same for the embodiments of FIGS. 4, 8 and 10, that is, as shown in FIG. 5. The baseplate 11 is formed by injection molding of a synthetic resin such as polysulfone, polyethersulfone, and the like which are corrosion-resistant to ink. In the sides of the baseplate 11, the pressure chambers 12, nozzles 13, supply channels 14 and discharge passages 25 are formed as recessed portions. However, the nozzle member 31 in the embodiment of FIG. 10 is formed as a separate component as described above.

The width and depth of the nozzles 13 is approximately 50 microns, and the depth of the pressure chambers 12 and the channels 14 is approximately 100 microns. The vibration plates 16 are flat planar sheets of the same material as the baseplate 11 having a thickness of approximately 300 microns. The electrode 18 on the surface of the vibration plate 16 is applied by methods such as evaporation, printing, and the like. The vibration plates 16 and the baseplate 11 are fused together by an organic solvent such as methylethyl ketone (MEK) and the like so as to form the pressure chambers 12 and the supply channels 14, etc. The piezoelectric elements 17 are bonded to the vibration plate 16 by epoxy resin at the selected position opposite to the pressure chambers 12. The discharge end of the print head is carefully cut and polished in the process of manufacture.

The baseplate 11 and the vibration plates 16 can also be manufactured of borosilicate glass. In such a construction, thickness of the vibration plates 16 is approximately 150 microns, which is thinner than the vibration plate 16 which are fabricated of synthetic resin. The pressure chamber 12, supply channels 14, and discharge passages 25 and the nozzles 13 are formed in the glass by etching, and the baseplate 11 and vibration plates 16 are bonded together by heat and fusion bonding.

It should be understood that the pressure chambers 12, channels 14, discharge passages 25 and nozzles 13 may be formed on the vibration plates 16. However, they are preferably formed on the baseplate 11 for the embodiments of FIGS. 4 and 8. In such a construction with the nozzles, etc., on the vibration plate 16 it is not necessary to meet the stringent requirements for positioning the nozzles on opposite sides of the same baseplate 11 as in those constructions where the pressure chambers 12, channels 14, discharge passages and nozzles 13 are formed in the baseplate 11.

In another manufacturing technique, the fusing and sealing treatment is applied between a phosphor bronze plate 11 and a vibration plate 16. The pressure chambers 12, channels 14, discharge passages 25 and nozzles 13 are formed in the plate 11 by means of etching.

A serial printer having an ink jet head in accordance with this invention is shown in FIG. 11 and includes an ink jet head 41 as shown in the embodiment of FIG. 4. A signal cable 42 is connected to each electrode 18, 19 and to a control circuit 43. Ink flows from a supply ink tank 45, passes through a tube 44 and is input to the ink jet head 41. A motor 46 rotates in either direction in accordance with a signal from the control circuit 43 and by means of a flexible loop 47, for example, cord or wire, causes a head carriage 48 to which the ink jet head 41 is attached to move reciprocally in parallel with a recording paper 49. The paper 49 is interposed between the ink jet head 41 and a roller surface or platen (not shown). As the ink jet head 41 moves relative to the paper 49, ink drops 21 are ejected in accordance with the signals from the control curcuit 43 to print serially characters or symbols on the recording paper 49. The character or symbols are printed in accordance with a dot matrix which is twenty-four dots in length.

FIG. 12 shows a character E as printed in dots by the printer of FIG. 11. A distance D is the same as shown in FIG. 8. In practice, it is desired that D be as small as possible in order to perform printing character by character. Dots from each nozzle row are alternated vertically.

The embodiments described above integrate two rows of nozzles in a construction using a single baseplate 11. The embodiments described hereinafter provide a highly integrated ink jet head by combining a plurality of components including a single row of nozzles, each component being constructed on an independent baseplate 11. The independent components having a single row of nozzles are considered as low integrated heads as compared to the previously described ink jet heads having two rows closely interrelated to print in an interspaced arrangement. FIG. 13 is an embodiment in accordance with this invention of a low integrated ink jet head. A side view of the ink jet head of FIG. 13 is the same as that shown in FIG. 5. Elements of the structures in FIGS. 13–22, having the same construction and function as in FIGS. 14–22 are given similar reference numerals. With reference to FIG. 13, a baseplate 11 has a pressure chamber 12, nozzles 13, supply channels 14 formed in one side surface thereof. A piezoelectric element 17 is bonded to a vibration plate 16 in a position opposing the pressure chamber 12. An electrode 18 is formed on the outside surface of the vibration plate 16 and an electrode 19 is formed on the outer surface of the piezoelectric element 17. The piezoelectric element 17 is round and has a diameter of 2.5 mm and the distances from the nozzles 13 to the corresponding piezoelectric elements 17 are alternately changed as shown in FIG. 5. This construction makes the ink jet head 27 as compact as 22 millimeters by 22 millimeters and shortens the average distance between the pressure chambers 12 and the nozzles 13. The nozzles are compactly arranged without deterioration in ink jet performance. The flow resistance at the discharge passages 25 of the pressure chambers 12 with the associated nozzles 13 are substantially equal. The ink flow channel 14, 25 from a supply pipe 15 to the nozzle 13 is smoothly contoured and connected and ink does not stagnate in the channel.

As shown in FIG. 6, a flow dividing member 23 is provided at the entrance to the pressure chambers 12 where the ink flows from the supply channel 14. Ink flows in the directions indicated by the arrows 24. The dividing member 23 prevents a flow of ink only through the central portion of the pressure chambers 12 and distributes the flow throughout the chambers 12. As previously stated, ink stagnates nowhere in the system so that an air bubble, which by change mingles in the ink is easily discharged with the ink. Accordingly, reliability of the ink jet head is improved. Fine grooves 20 are formed in the supply channels 14 having dimensions more minute than the nozzles 13. These fine grooves 20 serve as filters of particulate matter from the ink.

In the manner described above, ink drops 21 are ejected at high velocity from the nozzles 13 when the associated piezoelectric elements 17 are energized by the application of a voltage across the electrodes 18, 19.

An embodiment of a highly integrated jet head in accordance with this invention using a plurality of low integrated heads 27 constructed as in FIG. 13 is described with reference to FIGS. 14 and 15. A plurality of low integrated heads 27 are produced in identical contours. A groove or a pin (not shown) is used to hold the plurality of heads 27 in fixed positions on a support member 36 as shown in FIG. 14. The height of the nozzles 13 of the right-hand head differs from the height of the corresponding nozzles 13 in the left-hand head. The difference in height is one half of the nozzle pitch distance in a row of nozzles. This offset arrangement is fixed when the ink jet heads 27 are attached to support member 36 which is specially contoured to hold the heads in this arrangement.

The low integrated heads 27 of FIG. 14 are tilted so that there is an angle $\alpha$ between them as indicated in FIG. 15. As stated above, the smaller the angle $\alpha$ is the higher is the quality of the printed character which can be expected. When the distance between the highly integrated ink jet head the recording paper 22 goes beyond a predetermined length, it is difficult to get all of the dots in the desired linear position. For a deviation from the desired head to paper distance $\Delta l$, the ink drops 21 which are ejected at the same time from both heads 27 deviate from the selected position on the recording paper 22 by the amount $\Delta l \times \tan \alpha/2$. Accordingly, the smaller is the angle $\alpha$, the less deviation of the printed ink dot from its desired position. When the nozzles 13 and recording paper 22 are approximately 0.2 to 1 mm apart, the ink drops 21 are most likely to attach at the desired positions on the recording paper 22. However, it is difficult to arrange nozzles 13 as in FIG. 14 such that the ink drops 21 jetting from each low integrated head at the same time attaches in a straight line on the recording paper 22. In the structure of FIG. 14 the angle $\alpha$ cannot be made sufficiently small to meet these requirements because of the thickness of each identical low integrated head 27.

In order to successfully make the angle $\alpha$ sufficiently small for straight line printing from two heads 27, the heads 27 are constructed in a mirror-like arrangement. That is, the vibration plates 16 are disposed face to face in the interior of the angle $\alpha$. The angle $\alpha$ is then reduced making the combined highly integrated head come close to the recording paper where the ink jets from low integrated heads intersect to be deposited on a single line on the paper 22 (FIG. 15).

Figure 16:
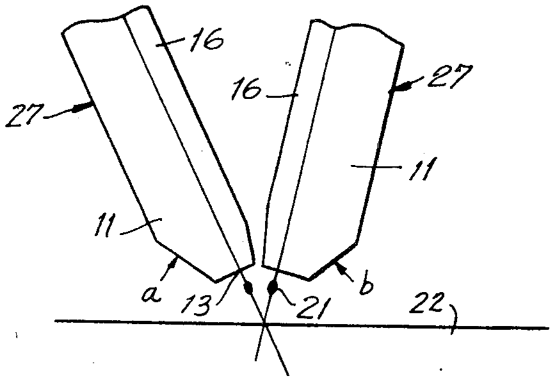
FIGS. 16 and 17 are schematic views of ink jet nozzle arrangements.

As seen in FIG. 16, the low integrated heads 27 can be brought closer to the paper 22 in order to get the proper intersection of ink jets at the surface of the paper 22 by chamfering the baseplate 11 at the lower outside corners as indicated by the arrows a and b.

Figure 17:
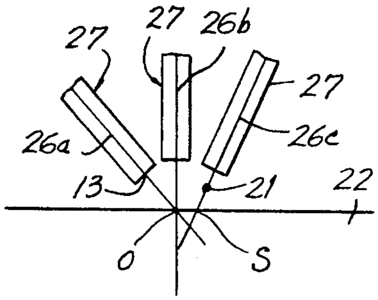

In an alternative embodiment (FIG. 17) three low integrated heads 27 are combined to make one highly integrated head. Planes *26a, 26b* and *26c* show the direction of the ink drops 21 as they are ejected in a high velocity stream from each low integrated head 27. Depending upon the accuracy of the support member (not shown in FIG. 17) one, two or three lines of dots can be printed on the paper 22. For example, when the recording paper 22 is positioned as indicated in FIG. 17, ink drops attach to the paper 22 along a line at the position "0" which is the intersection of planes *26a* and *26b*. However, there is another line of dots at the position S on the paper 22 where the plane *26c* intersects with the recording paper. Accordingly, printed quality is reduced. Nevertheless, printing quality can be anticipated to be higher when two jets from low integrated heads 27 are combined because there is always a line on the recording paper 22 where the two jet planes intersect if the distance between the heads and the paper is properly set.

Figure 18:
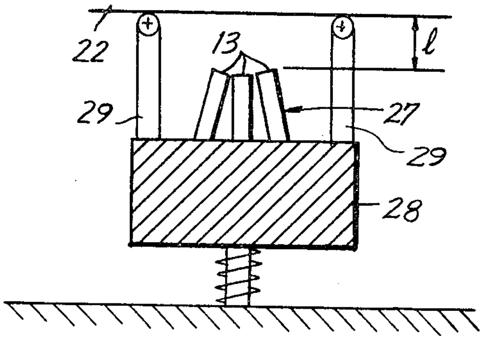
FIG. 18 is a schematic top view of a highly integrated jet head in accordance with this invention.

When the angle $\alpha$ is not zero, a head unit 28 comprised of a plurality of low integrated heads 27 can be positioned relative to the recording paper 22 (FIG. 18) by spacers 29 so as to keep a constant distance l between the nozzles 13 and the recording paper 22. With this fixed spacing between ink jet head and the paper 22, printing quality is higher. When rollers, as indicated in FIG. 18, are used at the ends of the spacers 29, the recording paper 22 is not dragged or pushed from its desired position by the motion of the print head.

As stated above, it is not always desired to print a single line from the plurality of rows of nozzles. But when the ink drops attach at the same line of the recording paper 22, the control circuit is simplified and the quality of the printed character is not deteriorated even when the rotational rate of the motor and the printer changes. Further, when a single line is printed, the printed character can be recognized as soon as the printing has been completed. When the ink drops attach on separate lines, a more complex control circuit is required, generally including a delay circuit. But by avoidance of simultaneous ejection of ink drops from two heads 27, it is possible to reduce the peak current required for the ink jet head and a smaller power source will serve the purpose. When the space between two lines of ink drops 21 ejected from a plurality of low integrated heads 27 at the same time is set less than the space between the printed characters, for example, a five-dot pitch distance between characters, printing is easily controlled and managed. Movement of a highly integrated head in only one direction makes it possible to print serially as in the operation of a typewriter. When the angle $\alpha$ is zero, less problems arise than in the case where the angle $\alpha$ is large.

Figure 19:
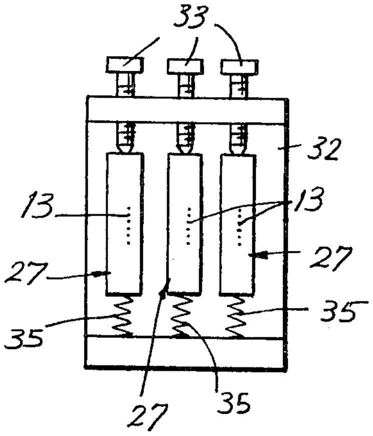
FIG. 19 is another embodiment of a highly integrated ink jet head as seen in a front view.

FIG. 19 shows another alternative embodiment of a highly integrated ink jet head in accordance with this invention. Three low integrated heads 27 are combined into a highly integrated head by means of an adjustable support member 32 which operates in combination with adjusting springs 35 and adjusting screws 33. Each low integrated head 27 is set vertically (FIG. 19) and independently of the other heads 27 by adjusting the screw 33. Provision is also made for moving the heads 27 from left to right (FIG. 19) and fastening them in a selected position. The heads may stand vertically or be inclined and set apart with an angle between them.

In FIG. 19, all of the low integrated heads 27 are adjustable in their positions. Nevertheless, a single low integrated head 27 may be permanently fixed while the other two heads 27 are adjustable as described above. Further, two of the low integrated heads 27 may be fixed in their position and constructed to a standard size, and the remaining head 27 may be adjustable in its position. In every case, the desired objectives can be attained in producing the desired arrangement of dots on the print paper. Further, it should be understood that the objective of adjustability can also be attained by using a rubber or other flexible mounting in place of the adjusting springs 35 or by exchanging the adjusting screws 33 for eccentric cams.

Figure 20:
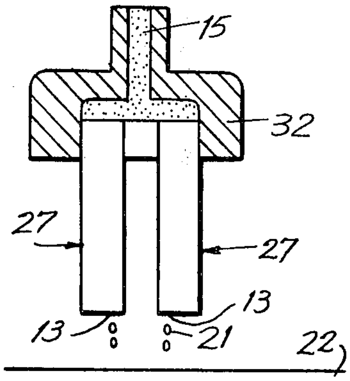
FIGS. 20, 21 and 22 are schematic views of alternative embodiments of highly integrated ink jet heads in accordance with this invention.

FIG. 20 shows another alternative embodiment of an ink jet head in accordance with this invention. In FIG. 20, positions for low integrated heads 27 are set by the support member 32 which has a single ink supply channel 15 for inputting ink to each low integrated head 27. Accordingly, the process for supplying ink to the assembled highly integrated head is simplified and the head is miniaturized.

Figure 22:
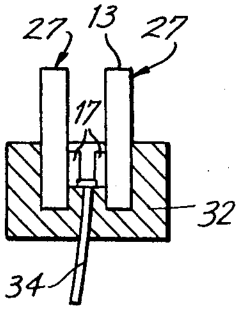
Figure 21:
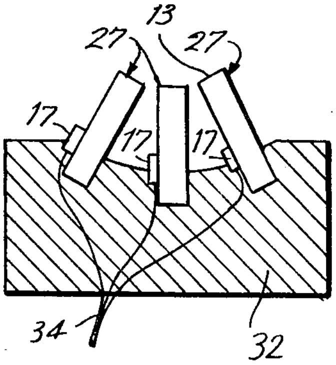

FIGS. 21 and 22 are additional alternative embodiments of highly integrated ink jet heads in accordance with this invention. In FIG. 21, a signal cable 34 connects to the plurality of piezoelectric elements 17 in each low integrated head. The signal cable 34 is imbedded in the support member 32. When the low integrated heads 27 are fixed to the support member 32, connections through the wiring harness 34 is completed. The signal cable 34 and the electrode of the piezoelectric element 17 may be pressed together and connected by means of a spring or joined and connected by means of a conductive adhesive or other combining agent.

In FIG. 22, two low integrated heads 27 are positioned back to back pressing against each other and supporting a flat cable 34 between them which is used for the electrical connections. When the two heads 27 are fixed to the support member 32, electrical conduction is accomplished through the signal cable 34. The embodiments of FIGS. 21 and 22 are characterized in that conduction through the signal cable 34 is highly integrated which is an aid to mass production.

The low integrated head 27 of the above described embodiments has in the order of 8 to 16 nozzles 13, and the exterior dimensions are 22 by 22 by 2 mm. Using these low integrated heads 27, a highly integrated head is manufactured into a simplier structure and by simplier procedures than the highly integrated heads manufactured with the vibration plates, pressure chambers, nozzles and flow channels on both side of a central baseplate. As a result, the yield ratio in production increases and mass production is also facilitated.

The manufacturing process of the low integrated head 27 is described hereinafter. When a photo etching process is applied for making a groove, there is a yield of 80 percent of non-defective units when only one side is photo etched. This yield falls to less than 64 percent when photo-etching is accomplished on both sides. Also, in using a highly integrated head formed of a plurality of low integrated heads, it is only necessary to exchange a single defective low integrated head when that head is defective. On the other hand, when the nozzles, etc, are formed on both sides of the baseplate, the entire highly integrated head must be exchanged even though only one side is defective. The highly integrated heads in accordance with this invention have a low volume as compared with the prior art structure of FIG. 3. Also, the construction of a highly integrated head in accordance with this invention using a plurality of low integrated heads can be adapted to form many configurations of ink jet heads.

The pressure chambers, nozzles, etc., shown in FIG. 13 and FIGS. 14–22, are all arranged in the same manner as that shown in FIG. 5 when seen in a side view. Again, a glass which is highly corrosive resistant to ink, such as borosilicate glass, is used in constructing the baseplate 11. Recesses for the pressure chambers, ink supply channels, filters and nozzles are formed by photo etching. The same kind of glass is used for the vibration plate 16. The baseplate 11 and the vibration plate 16 are connected by adhesion using heat. The pressure chambers, etc., may be formed on the side of the vibration plate 16, however the vibration plate can be as thin as 0.15 mm so it is easier to construct these elements on the baseplate 11. The electrode 18 on the vibration plate 16 is formed by printing a conductive material on the suface or by using an evaporatively deposited film of gold. A desirable material is a conductive glass film such as commercially available NESA glass through which ink and air bubbles existing in the insides of the head are directly observable.

An exemplary low integrated head 27 in accordance with this invention is 22 by 18 millimeters, with a baseplate having a thickness of 1.3 millimeters. The thickness of the vibration plate 16 is 0.15 mm and the diameter of the piezoelectric element 17 is 2.5 mm. There are twelve nozzles 13 and the cross section of a nozzle is 40 by 100 microns. The pitch distance between nozzles in a row is 0.3 millimeters and the depth of the flow channels other than the nozzle itself is in the order of 70 to 100 microns. By applying voltages of 40 to 200 volts to the piezoelectric elements 17, ink drops of various diameters are ejected at high velocities from the nozzles and a gradation in intensity of the ink is effected on the paper.

A printer head may be made by injection molding of materials other than glass, for example, as stated above, synthetic resins having a resistance to ink such as polysulfone and polyether may be used. In such a construction, the nozzles may be square in cross section. This decision depends upon the depth of the flow channels which are generally set in the range of 100 to 500 microns. A vibration plate made of the same materials is softer than that made of glass. Accordingly, a vibration plate of synthetic resin is generally more than 300 microns in thickness and formed with an electrode 18 on its surface by evaporation techniques or by printing.

The vibration plate 16 and the baseplate 11 are fused and joined by an organic solvent such as MEK and the pressure chamber 12 and the supply channels 14 are formed by the joining of these elements. The piezoelectric element 17 is joined in its predetermined position on the vibration plate by use of an epoxy resin. The nozzle portion of a head made of synthetic resins is cut off and polished at the nozzle end.

It should be apparent from the description above that a highly integrated ink jet head is readily obtained by combining a plurality of low integrated heads. Using such a highly integrated head, characters of almost the same quality as that produced by conventional type is produced by dot matrix printing. The pressure chambers, nozzles and channels are formed so as to allow a free flow of ink without stagnation. Thus, any air bubble which mingles inadvertently in the ink supply can be easily discharged through the nozzles. The filter portion can be made integral with the supply channels. Therefore, dust or other debris rarely clogs the nozzles. When the angle $\alpha$ between two vibration plates is properly selected, the control circuit is simplied or a dynamic drive can be performed. When the head is made by injection molding using a synthetic resin, the ink supply pipe 15 can be formed in a body with the baseplate 11. When the head is made by using a transparent resin or a transparent glass, the condition of the ink within the head can be observed.

This invention provides a miniaturized ink jet head which can be manufactured at a low cost and which produces a high quality printed character on a recording paper. This highly integrated ink jet head is suitable for application to various printers, plotters, facsimile and copying presses.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A highly integrated ink jet head for printing on a print recording medium, comprising:

a baseplate;

a pair of vibration plates, each vibration plate abutting and attached to one of opposite sides of said baseplate;

pressure chambers for containing ink between each said vibration plate and said baseplate;

a supply channel for containing ink connected to each said pressure chamber;

a plurality of piezoelectric elements attached to each said vibration plate, each said piezoelectric element being in registry with one of said pressure chambers;

a plurality of nozzles, each said nozzle connected with one of said pressure chambers;

said opposed baseplate sides converging toward said nozzles and forming a narrowed end, said vibration plates extending on both sides beyond said narrowed end and abutting one to the other, said nozzles being formed between said abutting vibration plates, ink being ejected from associated nozzles when said piezoelectric elements are energized to deflect said vibration plates.

2. A highly integrated ink jet head for printing as claimed in claim 1, wherein said nozzles are between said vibration plates and said baseplates, and further comprising channels between said vibration plates and said baseplate providing said connection between said nozzles and said associated pressure chambers.

3. A highly integrated ink jet head as claimed in claim 2, wherein said nozzles associated with one vibration plate form a linear row and said nozzles associated with the other vibration plate forms a linear row, said nozzles in each row being uniformly spaced apart, the nozzles in one row being centered at positions corresponding to the midpoints between nozzles of the opposite row.

4. A highly integrated ink jet head as claimed in claim 3, wherein the number of pressure chambers, channels and nozzles on each side of said baseplate is at least three and the distance of adjacent chambers from said connected nozzles is different, said distance increasing and decreasing in an alternating pattern.

5. A highly integrated ink jet head as claimed in claim 4, wherein a pressure chamber on one side of said baseplate is not in registry with a pressure chamber on the other side of said baseplate.

6. A highly integrated ink jet head as claimed in claim 1, wherein said nozzles form a single row of nozzles, nozzles associated with said channels on one side of said baseplate being alternated in said row with nozzles associated with said channels on the other side of said baseplate.

7. A highly integrated ink jet head as claimed in claim 1, wherein said chambers, channels, and nozzles are formed in said baseplate.

8. A highly integrated ink jet head as claimed in claim 1, wherein said chambers, channels, and nozzles are formed in said vibration plates.

9. A highly integrated ink jet head as claimed in claim 1, wherein said baseplate and said vibration plates are glass and the interior of said ink jet head is visible.

10. A highly integrated ink jet head as claimed in claim 1, wherein said baseplate and said vibration plates are fabricated of synthetic resin.

* * * * *